(12) United States Patent
Varghese et al.

(10) Patent No.: US 10,938,659 B2
(45) Date of Patent: Mar. 2, 2021

(54) FIBRE CHANNEL FORWARDER PORT CONFIGURATION SYSTEM

(71) Applicant: Dell Products L.P., Round Rock, TX (US)

(72) Inventors: Vibin Varghese, Tamil Nadu (IN); Ramesh Kumar Subbiah, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 16/042,305

(22) Filed: Jul. 23, 2018

(65) Prior Publication Data

US 2020/0028748 A1    Jan. 23, 2020

(51) Int. Cl.
*H04L 12/24* (2006.01)
*H04L 12/937* (2013.01)
*H04L 12/931* (2013.01)

(52) U.S. Cl.
CPC ........ *H04L 41/0886* (2013.01); *H04L 49/253* (2013.01); *H04L 49/357* (2013.01)

(58) Field of Classification Search
CPC . H04L 41/0886; H04L 41/0876; H04L 41/08; H04L 41/00; H04L 49/357; H04L 49/35; H04L 49/00; H04L 49/253; H04L 49/25
USPC ....................................................... 370/254
See application file for complete search history.

(56) References Cited

U.S. PATENT DOCUMENTS

| | | | | |
|---|---|---|---|---|
| 8,626,967 | B1* | 1/2014 | Naik | G06F 11/20 710/38 |
| 8,767,751 | B2* | 7/2014 | Dhar | H04L 12/4641 370/401 |
| 2012/0177041 | A1* | 7/2012 | Berman | H04L 12/4625 370/392 |
| 2012/0177370 | A1* | 7/2012 | Berman | H04L 49/357 398/58 |
| 2012/0308232 | A1* | 12/2012 | Eisenhauer | H04L 49/357 398/45 |
| 2015/0312172 | A1* | 10/2015 | May | H04L 49/357 370/401 |
| 2016/0191299 | A1* | 6/2016 | Shiraki | H04L 49/357 370/408 |
| 2018/0234384 | A1* | 8/2018 | Fang | H04L 67/1097 |

* cited by examiner

*Primary Examiner* — Jeffrey M Rutkowski
*Assistant Examiner* — Luna Weissberger
(74) *Attorney, Agent, or Firm* — Haynes and Boone, LLP

(57) ABSTRACT

A Fibre Channel Forwarder (FCF) port auto-configuration system includes a Fibre Channel (FC) networking device and an FCF device that includes a plurality of ports. The FCF devices configures, in response to a link being established on a first port of the plurality of ports, the first port as a first type port that indicates that the first port is connected to a second type port on the FC networking device. The FCF device provides a first fabric login through the first type port. In response to the FCF device not receiving an acceptance of the first fabric login after a first predetermined time threshold, the FCF device configures the first port as the second type port.

16 Claims, 7 Drawing Sheets

_US 10,938,659 B2_

FIBRE CHANNEL FORWARDER PORT CONFIGURATION SYSTEM

BACKGROUND

The present disclosure relates generally to information handling systems, and more particularly to automatic Fibre Channel Forwarder (FCF) port configuration in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide a Fibre Channel (FC) Storage Area Network (SAN) for the storage of data. In such systems, an FC switch may be utilized to couple the FC SAN to servers via a Fibre Channel Forwarder (FCF) that performs FC over Ethernet (FCoE)-to-FC protocol conversions on Ethernet communications sent from the servers to the FC SAN, as well as FC-to-FCoE protocol conversions on FC communications sent from the FC SAN to the servers. Such FCFs allow for server that communicate via the Ethernet protocol to utilize FC SANs that communicate via the FC protocol. However, the conventional functionality of such FCFs raises a number of issues.

For example, servers in such systems may utilize a Converged Network Adapter (CNA) to communicate with an N_Port ID Virtualization (NPIV) Proxy Gateway (NPG) in the FCF in order to provide login communication for logging into the FC SAN, with the FCF converting those login communications and the NPG providing them to the FC switch in order to log the server into the FC SAN. CNAs, host bus adapters (HBA), and/or other NPGs may be coupled to various ports of the NPG, while the FC Switch may be coupled to one or more ports of the NPG as well. The NPG ports coupled to the FC switch should be configured as Node Ports (N_Ports), while the NPG ports coupled to the CNAs, HBAs, other NPGs, and/or other downstream devices should be configured as Fabric Ports (F_Ports). However, conventional NPGs require the ports of the NPG to be configured manually, and such manual configuration results in errors, requires user input devices to manage the configurations, and is time consuming for a network administrator.

Accordingly, it would be desirable to provide an improved FCF port configuration system.

SUMMARY

According to one embodiment, an Information Handling System (IHS) includes a plurality of ports; a processing system that is coupled to the plurality of ports; and a messaging system that is coupled to the processing system and that includes instructions that, when executed by the processing system, cause the processing system to provide an N_Port ID Virtualization (NPIV) Proxy Gateway (NPG) engine that is configured to: configure, in response to a link being established on a first port of the plurality of ports, the first port as a first type port that indicates that the first port is connected to a second type port on the FC networking device; provide a first fabric login through the first type port; and configure, in response to not receiving an acceptance of the first fabric login after a first predetermined time threshold, the first port as the second type port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
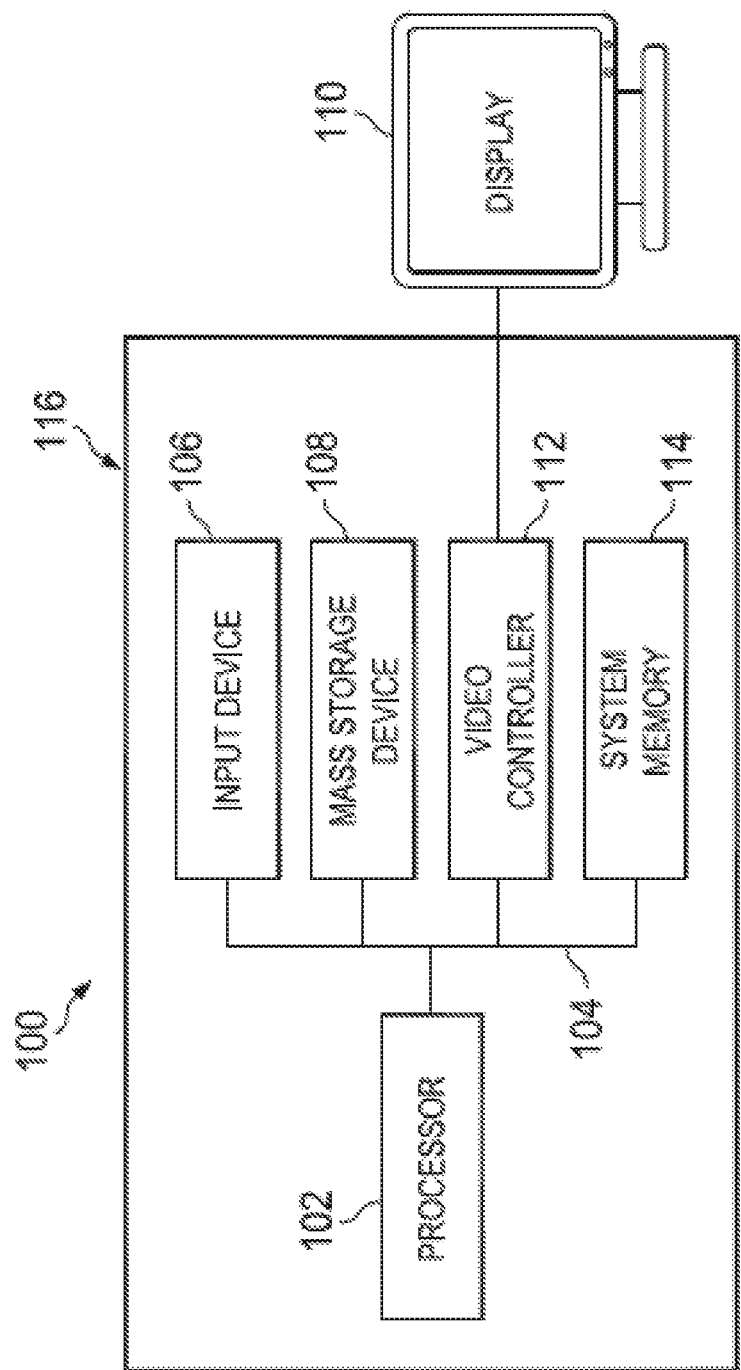
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
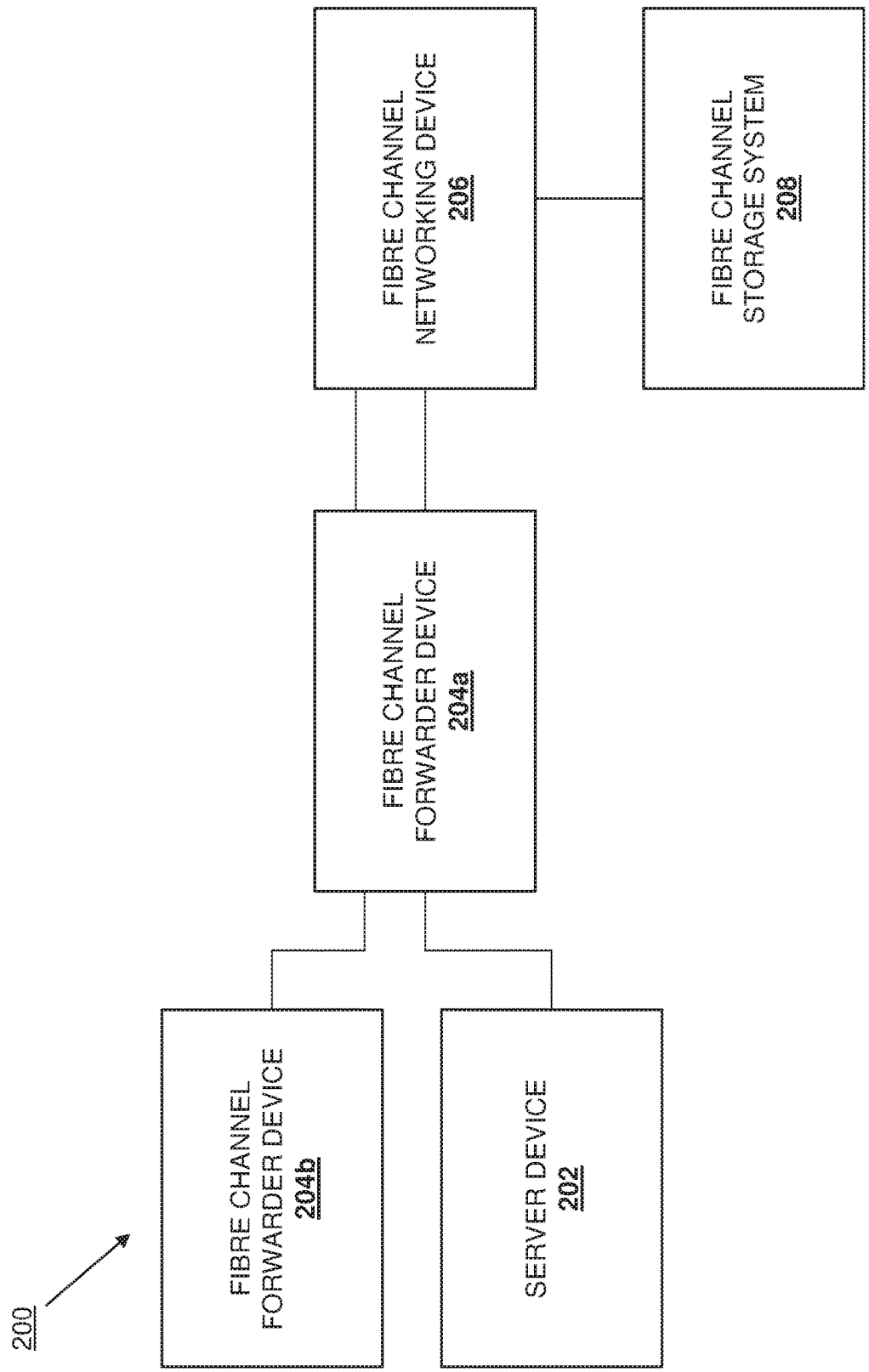
FIG. 2 is a schematic view illustrating an embodiment of a Fibre Channel Forwarder (FCF) port configuration system.

Referring now to FIG. 2, an embodiment of a Fibre Channel Forwarder (FCF) port configuration system 200 is illustrated. In the illustrated embodiment, the FCF port configuration system 200 includes a server device 202 that may be the IHS 100 discussed above with reference to FIG. 1 and/or that may include some or all of the components of the IHS 100. For example, the server device 202 may include one or more servers in a server rack or server chassis, and one of skill in the art in possession of the present disclosure will recognize that any number of servers may be provided in the FCF port configuration system 200 and may operate similarly to the server devices discussed below. In the illustrated embodiment, the server device 202 is coupled to a Fibre Channel Forwarder (FCF) device 204a that may be the IHS 100 discussed above with reference to FIG. 1 and/or that may include some or all of the components of the IHS 100. For example, the FCF device 204a may be provided by a switch or other networking device that is configured to receive Ethernet communications from the server device 202, convert those Ethernet communications to Fibre Chanel (FC) communications, forward those FC communications to an FC Storage Area Network (SAN), receive FC communications from the FC SAN, convert those FC communications to Ethernet communications for forwarding to the server device 202, and/or perform other FCF device functionality that would be apparent to one of skill in the art in possession of the present disclosure.

In the illustrated embodiment, the FCF device 204a is coupled to an FC networking device 206 that may be the IHS 100 discussed above with reference to FIG. 1 and/or that may include some or all of the components of the IHS 100. For example, the FC networking device 206 may be provided by a FC switch that is configured to receive FC communications (e.g., initialed by the server device 202) from the FCF device 204a, log the server device 202 into an FC SAN, subsequently receive FC communications (e.g., initialed by the server device 202) from the FCF device 204a to allow the server device 202 to communicate with the FC SAN, and perform a variety of other FC networking device functionality that would be apparent to one of skill in the art in possession of the present disclosure.

In the illustrated embodiment, the FC networking device 206 is coupled to an FC storage system 208 that may be the IHS 100 discussed above with reference to FIG. 1 and/or that may include some or all of the components of the IHS 100. For example, the FC storage system 208 may be provided by a FC SAN that is configured to receive FC communications from the server device 202 through the FC networking device 206, send FC communications to the server device 202 through the FC networking device 206, and/or perform a variety of other FC storage system functionality that would be apparent to one of skill in the art in possession of the present disclosure. While a specific FCF port configuration system 200 is illustrated and described below, one of skill in the art in possession of the present disclosure will recognize that the teachings of the present disclosure will be beneficial for a variety of FC systems known in the art and, as such, a wide variety of modifications to the number, types, and orientation of devices in the FCF port configuration system 200 will fall within the scope of the present disclosure as well. For example, the FCF device 204a may be coupled to additional server devices indirectly via, e.g., an FCF device 204b that is directly coupled with the FCF device 204a, as illustrated in FIG. 2.

Figure 3:
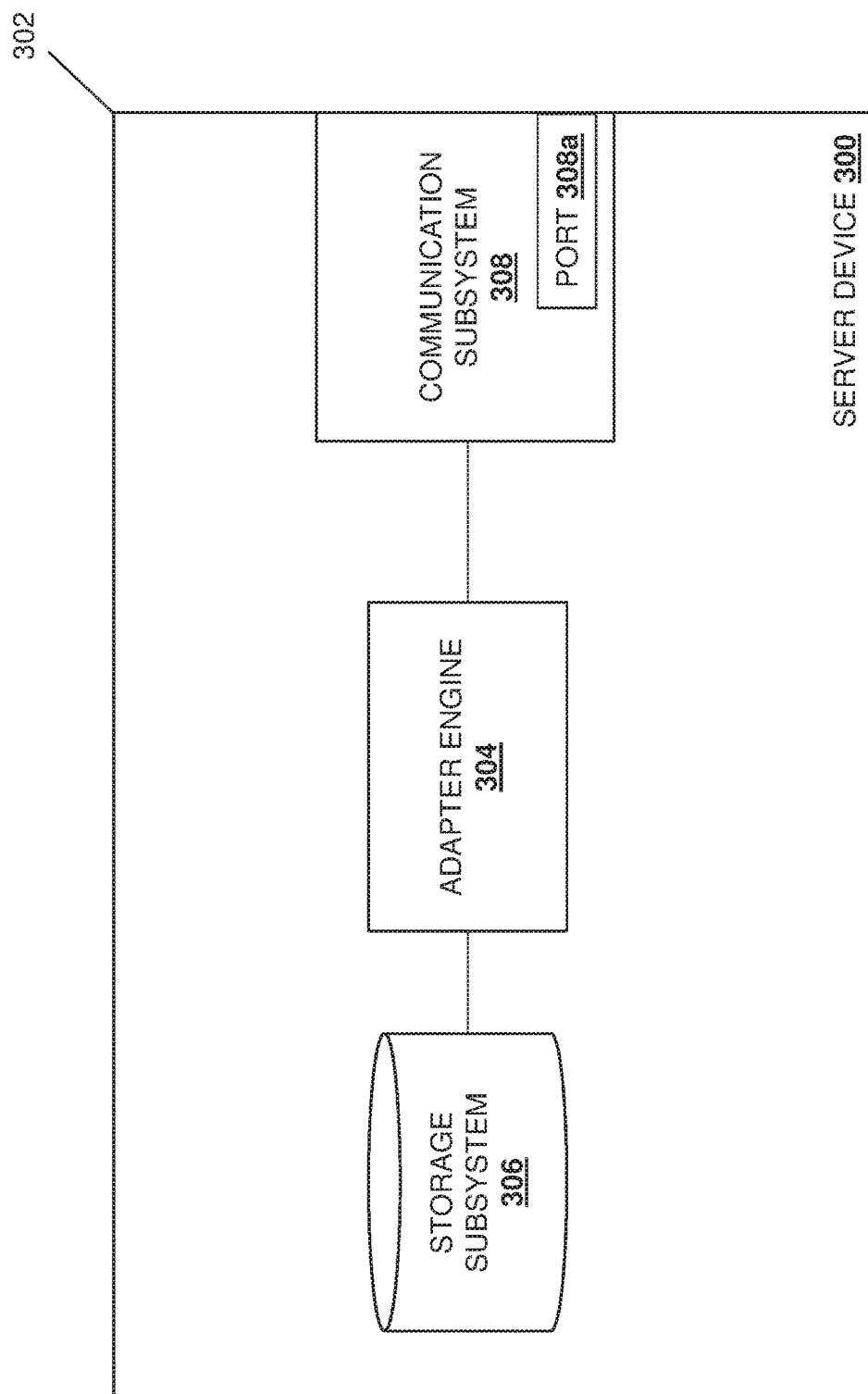
FIG. 3 is a schematic view illustrating an embodiment of a server device in the FCF port configuration system of FIG. 2.

Referring now to FIG. 3, an embodiment of a server device 300 is illustrated that may be the server device 202 discussed above with reference to FIG. 2. As such, the server device 300 may be the IHS 100 discussed above with reference to FIG. 1 and/or may include some or all of the components of the IHS 100, and in specific examples may be one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, one or more ports (e.g., a port 308a in the illustrated embodiment), and/or other communication components known in the art. Furthermore, in some embodiments, components of the adapter engine 304 and/or the communication subsystem 308 may be provided by a Converged Network Adapter (CNA) that performs the functionality of the adapter engines and/or server devices discussed below. However, in other embodiments, the adapter engine 304 and/or communication subsystem 308 may be utilized to provide for other types of adapters (e.g., Host Bus Adapters (HBAs)) while remaining within the scope of the present disclosure. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
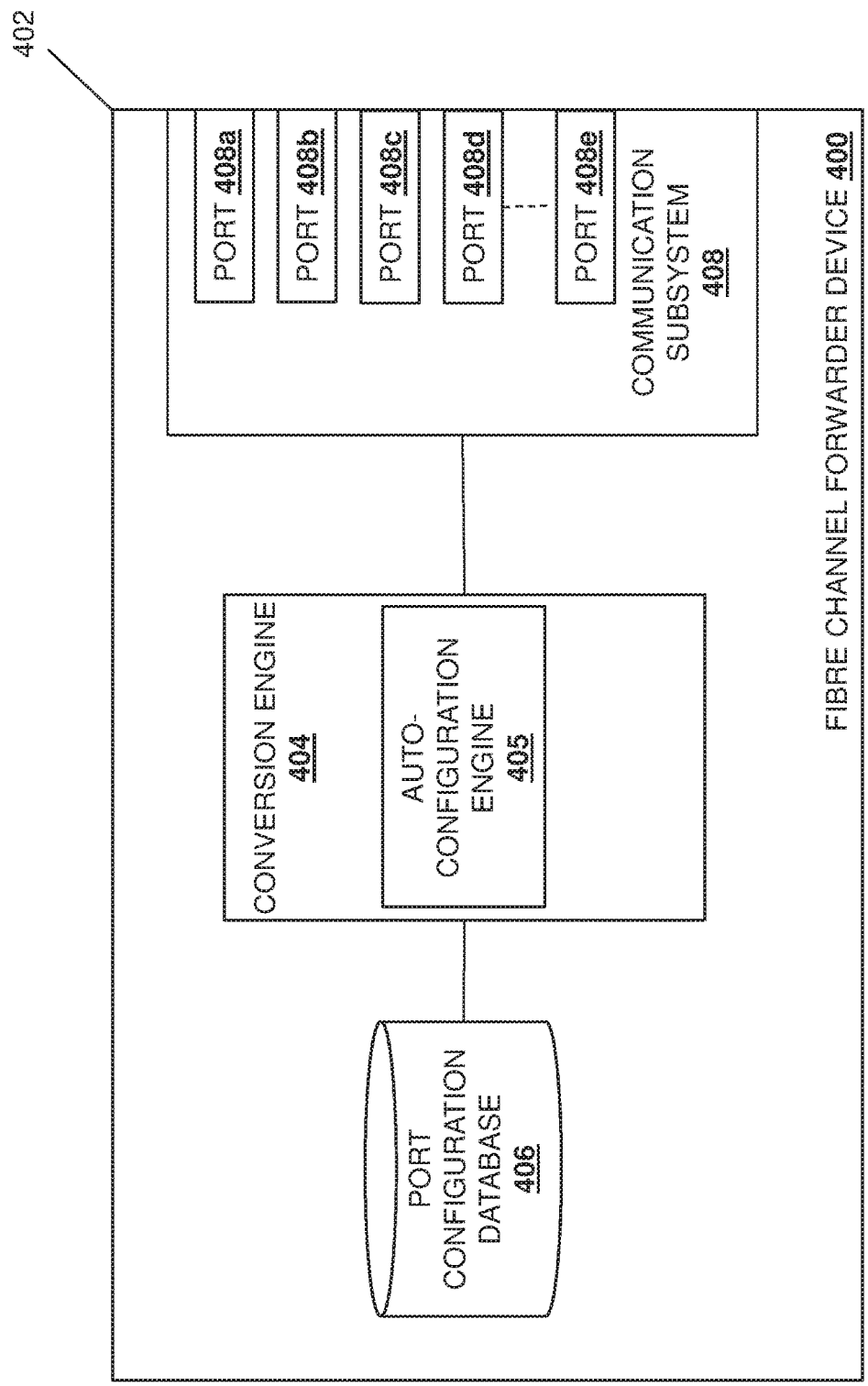
FIG. 4 is a schematic view illustrating an embodiment of an FCF device in the FCF port configuration system of FIG. 2.

Referring now to FIG. 4, an embodiment of a Fibre Channel Forwarder (FCF) device 400 is illustrated that may be the FCF device 204 discussed above with reference to FIG. 2. As such, the FCF device 400 may be the IHS 100 discussed above with reference to FIG. 1 and/or may include some or all of the components of the IHS 100, and in specific examples may be a switch or other networking device. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In another example, the conversion engine 404 may include an auto-configuration engine 405 that is configured to perform the functions of the auto-configuration engines and FCF devices discussed below such as, e.g., automatically configuring ports on the FCF device after a link on those ports has been established.

The chassis 402 may also house a storage system (not illustrated, but which may include the storage device 108 discussed above with reference to FIG. 1) that is coupled to the conversion engine 404 (e.g., via a coupling between the storage system and the processing system) and that may include a port configuration database 406 that is configured to store the data utilized as discussed below. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components known in the art. For example, in the illustrated embodiment, the communication subsystem 408 includes a plurality of ports (e.g., ports 408a, 408b, 408c, 408d, and up to 408e) that may be coupled to an FC networking device and/or a server device as discussed below. Furthermore, in some embodiments, components of the conversion engine 404 and/or the communication subsystem 408 may provide an NPG that performs the functionality of the conversion engines and/or server devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components that perform conventional FCF device functionality, as well as the functionality described below, while remaining within the scope of the present disclosure.

Figure 5:
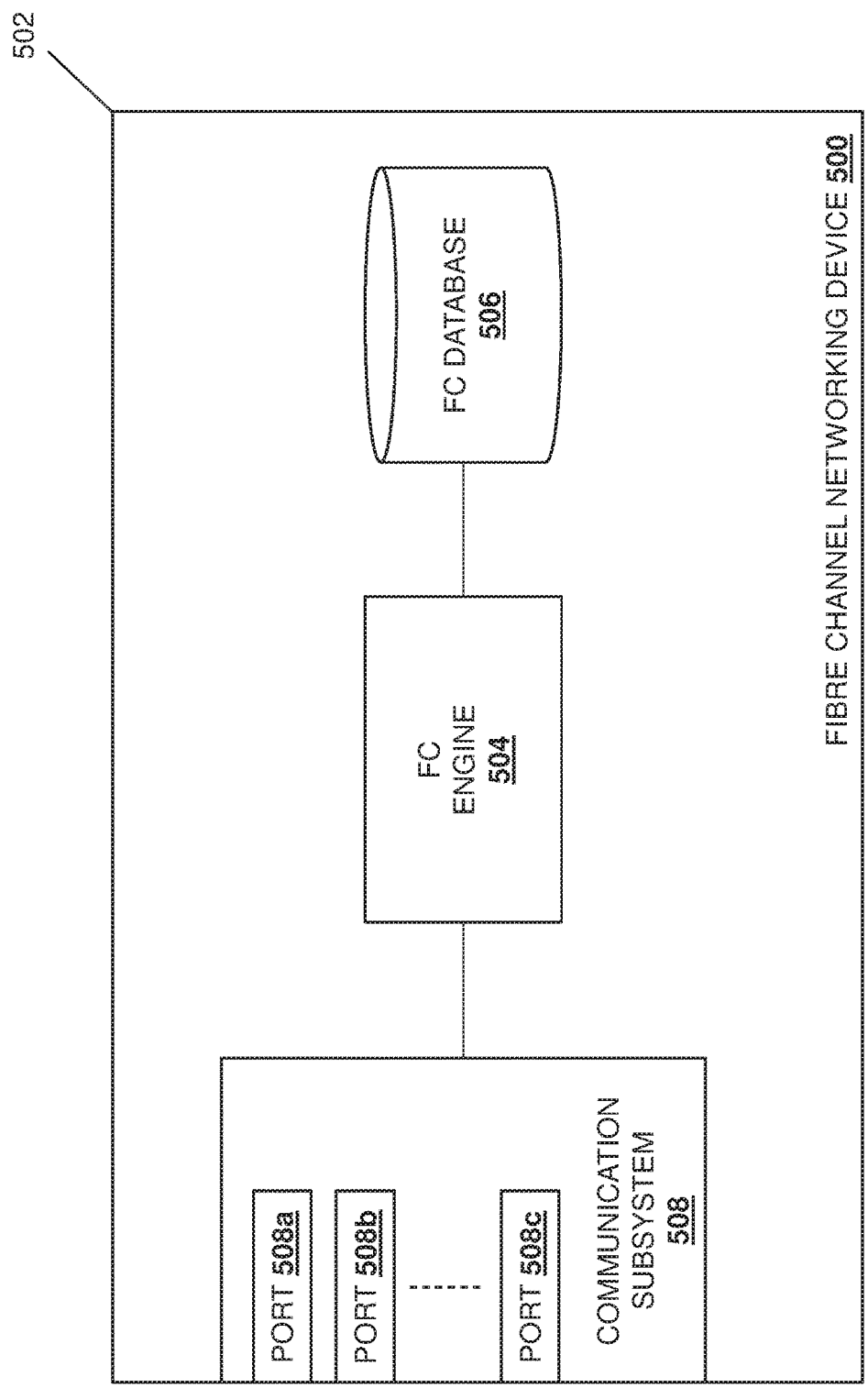
FIG. 5 is a schematic view illustrating an embodiment of an FC networking device in the FCF port configuration system of FIG. 2.

Referring now to FIG. 5, an embodiment of a Fibre Channel (FC) networking device 500 is illustrated that may be the FC networking device 206 discussed above with reference to FIG. 2. As such, the FC networking device 500 may be the IHS 100 discussed above with reference to FIG. 1 and/or may include some or all of the components of the IHS 100, and in specific examples may be an FC switch. In the illustrated embodiment, the FC networking device 500 includes a chassis 502 that houses the components of the FC networking device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a FC engine 504 that is configured to perform the functions of the FC engines and FC networking devices discussed below.

The chassis 502 may also house a storage system (not illustrated, but which may include the storage device 108 discussed above with reference to FIG. 1) that is coupled to the FC engine 504 (e.g., via a coupling between the storage system and the processing system) and that may include FC database 506 that is configured to store the data utilized as discussed below. The chassis 502 may also house a communication subsystem 508 that is coupled to the FC engine 504 (e.g., via a coupling between the communication subsystem 508 and the processing system) and that may include a Network Interface Controller (NIC), a wireless communication devices, ports, and/or other communication components known in the art. For example, in the illustrated embodiment, the communication subsystem 508 includes a plurality of ports 508a, 508b, and up to 508c, that may be coupled to an FCF device as well as an FC SAN, as discussed herein. While a specific FC networking device 500 has been described, one of skill in the art in possession of the present disclosure will recognize that the FC networking device 500 may include a variety of other components that perform conventional FCF FC networking device functionality, as well as the functionality described below, while remaining within the scope of the present disclosure.

Figure 6:
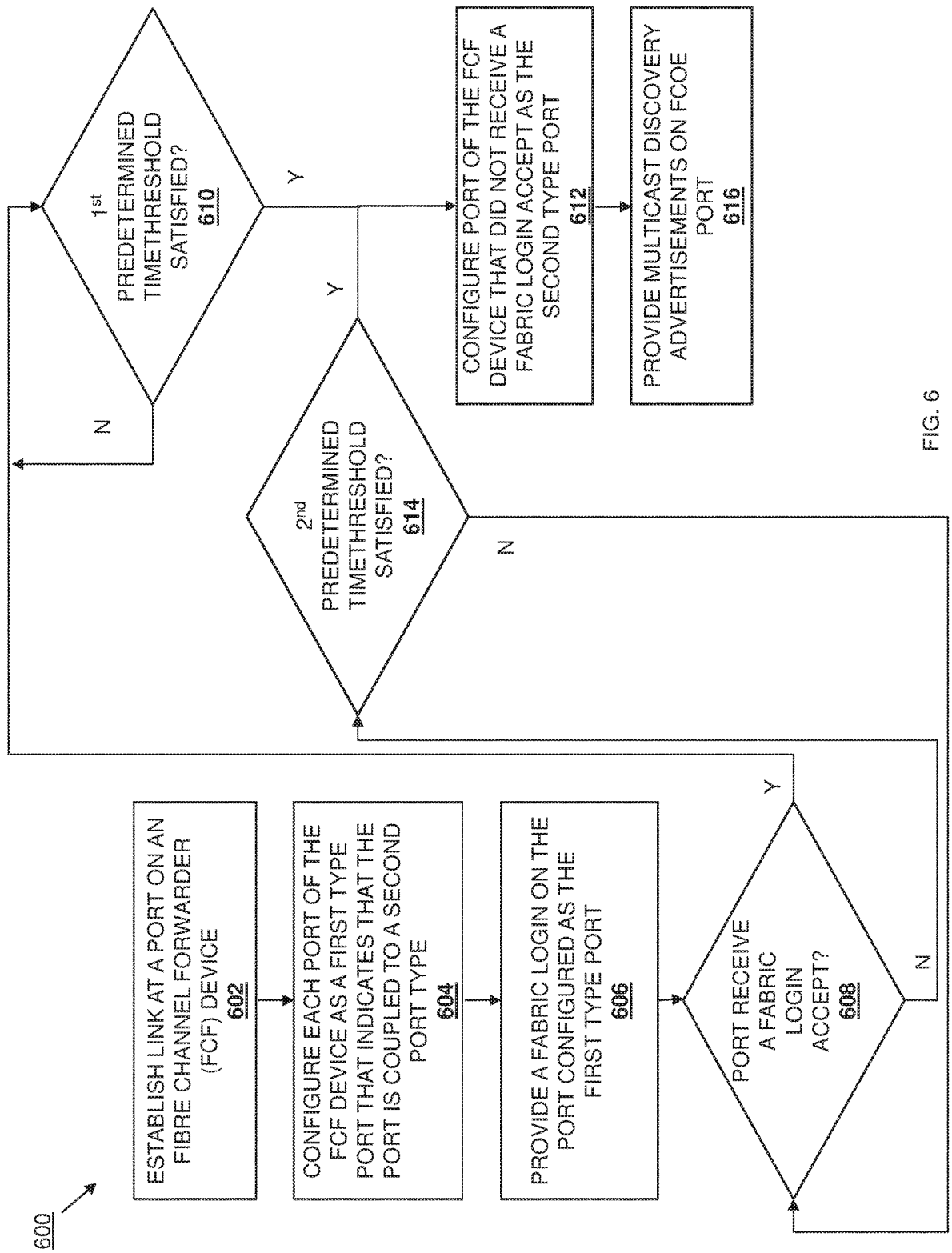
FIG. 6 is a flow chart illustrating an embodiment of a method for FCF port configuration.

Referring now to FIG. 6, an embodiment of a method 600 for FCF port configuration is illustrated. As discussed above, when connecting ports of an FCF device to other devices in a FC SAN, a port type of each port of the FCF device should be configured based on the device to which the port is connected. For example, the ports on the FCF device may include a node port (N_Port) or a Fabric Port (F_Port). Ports on the FCF device that are linked to an F_Port on an FC switch should be configured as N_Ports, while ports on the FCF device that are linked to N_Ports on host server devices and/or other FCF devices that are accessing the FC switch should be configured as F_Ports. As discussed above, conventional FCF devices require an administrator to manually configure each port of the FCF device as an F_Port or as an N_Port, which is time consuming, may result in incorrect configurations, and/or requires an input device at the FCF device. The systems and methods of the present disclosure resolve these deficiencies by automatically configuring the ports on the FCF device when a link is established at that port. For example, when a link is established at a port, the link may be initially configured as an N_Port that sends a fabric login (FLOGI) in an attempt to login to the FC SAN.

If the port receives a fabric login accept (FLOGI ACC) in response to sending the FLOGI, the FCF device will maintain the N_Port configuration and, after a predetermined time period, cause the other linked ports to be configured as F_Ports if those ports have not yet received a FLOGI ACC in response to respective FLOGIs sent by those ports. Such automatic configuration saves times, ensured correct port configurations, and negates the need for manual input devices at the FCF device.

The method 600 begins at block 602 where a link is established at a port on an FCF device. In an embodiment of block 602, the ports of the FCF device 204a (e.g., the ports 408a, 408b, 408c, and/or 408d illustrated in FIG. 4) may be connected to the ports of the FC networking device 206, the FCF device 204b, and/or the server device 202. For example, with reference to the FCF configuration diagram 700 of FIG. 7, the port 408a of the FCF device 204a may be connected to the port 508a of the FC networking device 206, the port 408b of the FCF device 204a may be connected to the port 508b of the FC networking device 206, the port 408c of the FCF device 204a may be connected to the port 308a of the server device 202, and/or the port 408d of the FCF device 204a may be connected to the port 408f of the FCF device 204b. In the example illustrated in FIG. 7, the port 408e of the FCF device 204a is not connected to another port. In one scenario, the FCF device 204a may be powered on and a link to each port 408a, 408b, 408c, and 408d may be initialized according to conventional link initialization techniques that would be apparent to one of skill in the art in possession of the present disclosure, while a link to the port 408e may not be initialized because the port 408e is not connected to another port. In other scenarios, a link may be established on a port while the other ports are currently providing a link. For example, a single port may experience a link reset, a reset of a connected device, some other link failure that causes the link to go down and reinitialize, or a new device may be connected at a port of the FCF device 204b.

The method 600 then proceeds to block 604 where the port of the FCF device is configured as a first type port that indicates that the port is coupled to a second type port on the FC networking device. In an embodiment of block 604, and with reference to the example in FIG. 7, the auto-configuration engine 405 may configure the ports 408a, 408b, 408c, and/or 408d as N_Ports and store those configurations in the port configuration database 406. In some examples, the auto-configuration engine 405 may configure the ports 408a, 408b, 408c, and/or 408d as N_Ports at block 604 regardless of the device to which each port is connected.

Figure 7:
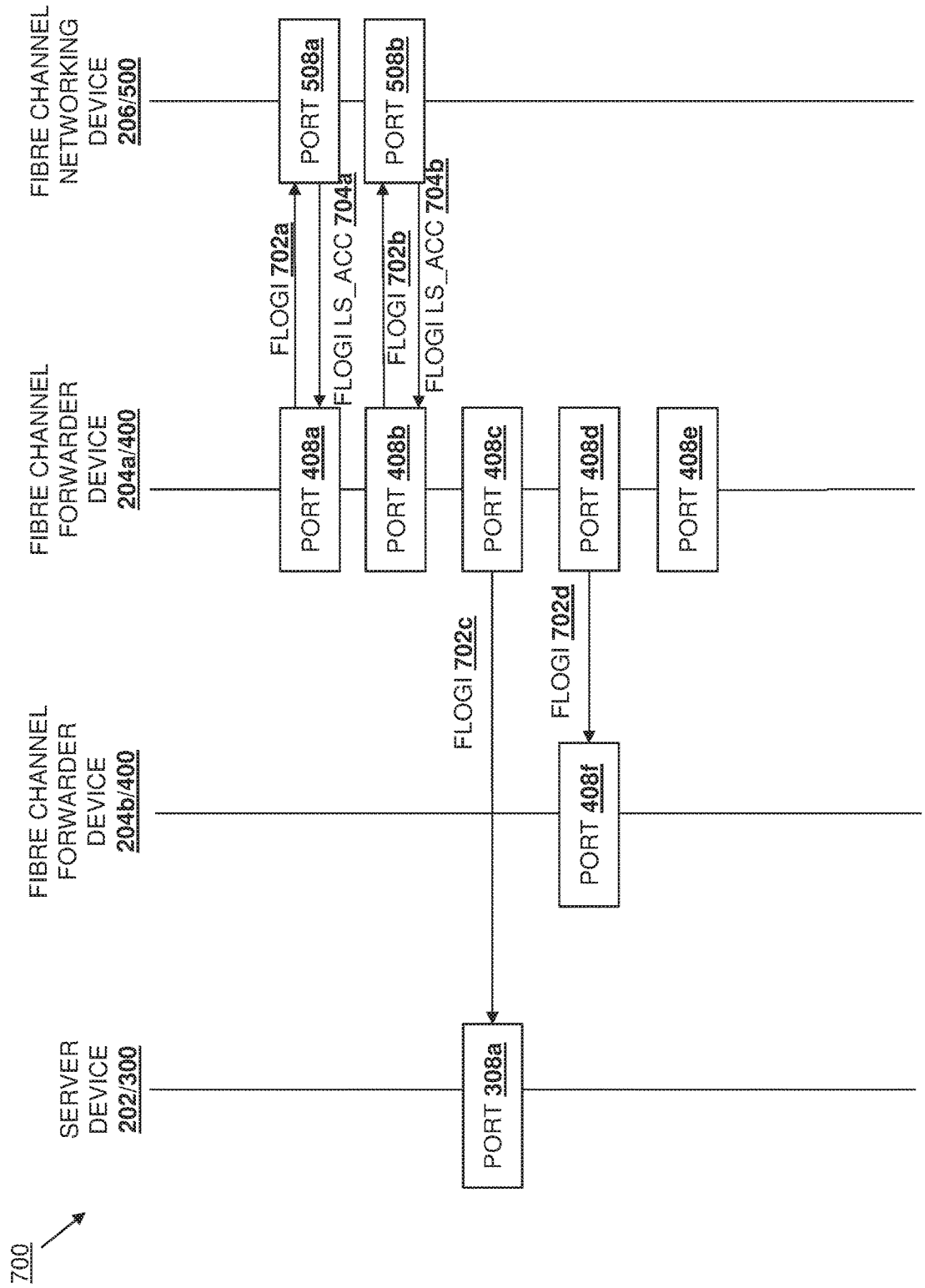
FIG. 7 is a diagram illustrating an embodiment of the FCF port configuration during the method of FIG. 6.

The method 600 then proceeds to block 606 where the port provides a fabric login through the port configured as the first port type. In an embodiment of block 606 and with reference to the example in FIG. 7, any or all of the ports 408a, 408b, 408c, and/or 408d may transmit a fabric login (FLOGI) on their respective links. For example, the port 408a may provide a FLOGI 702a to the port 508a of the FC networking device 206, the port 408b may provide a FLOGI 702b to the port 508b of the FC networking device 206, the port 408c may provide a FLOGI 702c to the port 308a of the server device 202, and/or the port 408d may provide a FLOGI 702d to the port 408f of the FCF device 204b. As can be seen in FIG. 7, ports to which a link is not established (e.g., the port 408e) may not send a FLOGI at block 606.

The method 600 then proceeds to decision block 608 where a determination is made as to whether a port of the FCF device has received a fabric login accept. In an embodiment of block 608, the FC engine 504 in the FC networking device 206/500 may receive at least one FLOGI (sent by the FCF device 204a through ports 408a and/or 408b) through at least one of the ports 508a and 508b in its communication subsystem 508, create a fabric login accept (FLOGI ACC) for each FLOGI received, and send that FLOGI ACC through the port 508a and/or 508b in its communication subsystem 508 to the FCF device 204a/400 such that the conversion engine 404 in the FCF device 204/400 receives any FLOGI ACC through at least one of the ports 408a and/or 408b in its communication subsystem 408. For example, with reference to FIG. 7, the FC engine 504 in the FC networking device 206/500 may receive the initial FLOGI 702a (sent by the conversion engine 404 through the port 408a) through the port 508a (e.g., that provides the link with the port 408a on the FCF device 204a/400), create a FLOGI link service accept (LS_ACC) 704a, and send the FLOGI LS_ACC 704a through the port 508a to the FCF device 204a/400 such that the NPG in the FCF device 204a/400 receives that FLOGI LS_ACC 704a through the port 408a. Likewise, the FC engine 504 in the FC networking device 206/500 may receive the initial FLOGI 702b (sent by the conversion engine 404 through the port 408b) through the port 508b (e.g., that provides the link to the port 408b on the FCF device 204a/400), create a FLOGI link service accept (LS_ACC) 704b, and send that FLOGI LS_ACC 704b through the port 508b to the FCF device 204a/400 such that the NPG in the FCF device 204a/400 receives that the FLOGI LS_ACC 704b through the port 408b.

If the FCF device 204a receives a FLOGI ACC, then the method 600 proceeds to decision block 610 where a determination is made as to whether a first predetermined time threshold has been satisfied. In an embodiment of decision block 610, the auto-configuration engine 405 may determine whether a predetermined time threshold has been satisfied. For example, after receiving a FLOGI ACC on at least one of the ports 408a, 408b, 408c, and/or 408d of the FCF device 204a, the auto-configuration engine 405 may wait a predetermined time period that may be configured to allow other FLOGI ACC that may have been sent to be received before the method 600 proceeds to block 612 discussed below. The predetermined time threshold may be set to a time period that allows ports to receive a FLOGI ACC in response to transmitting a FLOGI. For example, the predetermined time period may be 1 millisec. 10 millisec, 100 millisec, 1 sec and/or any other time threshold that would be apparent to one of skill in the art in possession of the present disclosure. If the predetermined time threshold has not been satisfied in decision block 610, the method 600 continues to loop until the predetermined time threshold has been satisfied.

If the predetermined time period has been satisfied at block 610, the method proceeds to block 612 where any port of the FCF device that did not receive a fabric login accept is configured as the second type port. In an embodiment of block 612, the auto-configuration engine 405 may configure any port of the FCF device 204a that did not receive a FLOGI ACC within the predetermined time period discussed above as F_Ports. Also, if the predetermined time period has been satisfied, the auto-configuration engine 405 may maintain those ports of the FCF device 204a that did receive a FLOGI ACC as N_Ports. For example, with reference to FIG. 7, while the port 408a of the FCF device 204a received the FLOGI LS_ACC 704a in response to FLOGI 702a, and the port 408b of the FCF device 204a received the FLOGI LS_ACC 704b in response to FLOGI 702b, the port 408c and the port 408d did not receive a FLOGI ACC. Thus, the auto-configuration engine 405 may configure the ports 408c and 408d as F_Ports while the ports 408a and 408b remain as N_Ports in the port configuration database 406.

Referring back to 608, if a port of the FCF device has not received a fabric login accept, the method proceeds to decision block 614 where a determination is made as to whether a second predetermined time threshold has been satisfied. In an embodiment of block 414, auto-configuration engine 405 may determine whether the second predetermined time threshold has been satisfied. In various embodiments, the second predetermined time threshold may be the first predetermined time threshold, may be defined by the same time period as the first predetermined time threshold, or may have a different value than the first predetermined time threshold. The second predetermined time threshold may be used to identify situations where none of the ports being configured should be N_Ports, and thus would never receive a FLOGI ACC in response to the FLOGI provided through those ports to advance the method 600 to block 610. For example, with reference to FIG. 7, the FCF device 204a may have previously configured the ports 408a and 408b as N_Ports and the ports 408c and 408d as F_Ports. The link through the port 408c may then reset, which causes the auto-configuration engine 405 to configure the port 408c as an N_Port. The auto-configuration engine 405 may then provide the FLOGI 702d through the port 408c and wait for a FLOGI ACC. Because the port 408d should be an F_Port and the ports 408a and 408b are already logged in, no FLOGI ACC will arrive at the FCF device 204a to advance method 600 from block 608 to block 610, and subsequently to block 612 to configure the port 408d as an F_Port. Thus, the method 600 may proceed to block 614 where the determination is made as to whether the second predetermined time threshold has been satisfied. If the second predetermined time threshold has not been satisfied, the method returns to block 608. If the second predetermined time threshold has been satisfied, the method 600 proceeds to block 612 discussed above, where the port 408d is configured as an F_Port.

In various embodiments of decision block 614 in addition to determining whether the second predetermined time threshold has been satisfied, a determination as to whether another port of the FCF device has receive a FLOGI ACC. If both the second predetermined time threshold and another port has received a FLOGI ACC, then the method 600 proceeds to block 612. Otherwise, the method 600 proceeds to block 608. The additional condition of determining whether another port of the FCF device 204a has received a FLOGI ACC may be used in situations where the FCF device 204a is coupled to FCF device 204b. For example, with reference to FIG. 7, the link between the port 408d of FCF device 204a and the port 408f may reset, which causes the auto-configuration engine 405 to configure the port 408d as an N_Port where it was previously an F_Port and the auto-configuration 405 of FCF device 204b may configure the port 408f as an N_Port. The auto-configuration engines 405 of both the FCF devices 204a and 204b may then provide a FLOGI through the port 408d and 408f, respectively. Because neither are F_Ports no FLOGI ACC will be returned cause the second predetermined time threshold to be satisfied. However, because the port 408f should be an N_Port and not an F_Port the second predetermined threshold cannot be used alone to determine whether to switch the N_Ports to F_Ports. Thus, each FCF device 204a and 204b also determine whether a FLOGI ACC has also been returned to an FCF device port such that there is one certain N_Port on the FCF device 204a. Because ports 408a and 408b of the FCF device 204a are N_Ports that received FLOGI ACC, the port 408d will become an F_Port after the predetermined time threshold has been satisfied while the port 408f will remain an N_Port because no N_Ports have been established that received a FLOGI ACC on the FCF device 204b. The port 408d, now an F_Port, will provide a FLOGI ACC in response to the FLOGI provided by the port 408f of the FCF device 204b and the FCF device 204b will maintain the N_Port configuration of the port 408f.

The method 600 then proceeds to block 616 where the FCF devices transmit multicast discovery advertisements (MDAs) through a Fibre Channel over Ethernet (FCoE) port that is included in the plurality of ports and that is configured as a third type port. In an embodiment of block 616 and with reference to FIG. 7, the server device 202 may include an adapter engine 304 that is a CNA, and thus the port 408c is an FCoE port. The FC networking device 206, after successful login of the ports 408a and 408b to the F_Ports 508a and 508b of the FC networking device 206, may begin transmitting multicast discovery advertisements that are forwarded by the FCF device 204a through the FCoE ports and set the port type as a virtual fabric port (VF_Port).

Thus, systems and methods have been described that provide for FCF port configuration by configuring, in response to link initialization of FCF ports of an FCF device as an N_Port, providing a fabric login through those ports, and configuring ports that do not receive a fabric login accept after a predetermined time period as F_Ports, while maintaining ports that do receive a fabric login accept as N_Ports. The FCF port configuration of the present disclosure provides for the automatic configuration of the FCF ports so that an administrator does not have to manually configure the FCF ports, negating the need for input devices at the FCF device, while reducing the time needed and errors associated with providing such configurations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel Forwarder (FCF) port auto-configuration system, comprising:
a Fibre Channel (FC) networking device; and
a Fiber Channel Forwarder (FCF) device that includes a plurality of ports and that is coupled to the FC networking device through at least one of the plurality of ports, wherein the FCF device is configured to:
automatically configure, in response to a link being established on a first port included in the plurality of ports, the first port as a node port that indicates that the first port is connected to a fabric port;
provide a first fabric login through the first port that is configured as the node port;
determine whether an acceptance of the first fabric login has been received within a first predetermined time threshold;
automatically configure, in response to not receiving an acceptance of the first fabric login within the first predetermined time threshold, the first port as the fabric port;
determine whether a second predetermined time threshold has been satisfied; and configure, in response to the second predetermined time threshold being satisfied, any of the plurality of ports that has an established link and that have not received an acceptance of a fabric login as fabric ports.

2. The FCF port auto-configuration system of claim 1, wherein the FCF device is further configured to:
maintain, in response to receiving an acceptance of the first fabric login before the first predetermined time threshold, the first port as the node port.

3. The FCF port auto-configuration system of claim 1, wherein the FCF device is further configured to:
transmit multicast discovery advertisements to a Fibre Channel over Ethernet port that is included in the plurality of ports and that is configured as a virtual fabric port.

4. The FCF port auto-configuration system of claim 1, wherein the FCF device is further configured to:
detect that the link on the first port has experienced a reset event and, in response, configure the first port as the node port;
provide a second fabric login through the node port; and
configured, in response to not receiving an acceptance of the second fabric login after a first predetermined time threshold, the first port as the fabric port.

5. The FCF port auto-configuration system of claim 1, wherein the FCF device is further configured to:
provide, when the first port is configured as the fabric port, an acceptance of a second fabric login received at the first port.

6. An Information Handling System (IHS), comprising:
a plurality of ports;
a processing system that is coupled to the plurality of ports; and
a messaging system that is coupled to the processing system and that includes instructions that, when executed by the processing system, cause the processing system to provide an N_Port ID Virtualization (NPIV) Proxy Gateway (NPG) engine that is configured to:
automatically configure, in response to a link being established on a first port included in the plurality of ports, the first port as a node port that indicates that the first port is connected to a fabric port;
provide a first fabric login through the first port that is configured as the node port;
determine whether an acceptance of the first fabric login has been received within a first predetermined time threshold;
automatically configure, in response to not receiving an acceptance of the first fabric login within the first predetermined time threshold, the first port as the fabric port;
determine whether a second predetermined time threshold has been satisfied; and
configure, in response to the second predetermined time threshold being satisfied, any of the plurality of ports that has an established link and that have not received an acceptance of a fabric login as fabric ports.

7. The IHS of claim 6, wherein the NPG engine is further configured to:
maintain, in response to receiving an acceptance of the first fabric login before the first predetermined time threshold, the first port as the node port.

8. The IHS of claim 6, wherein the NPG engine is further configured to:
transmit multicast discovery advertisements to a Fibre Channel over Ethernet port that is included in the plurality of ports and that is configured as a virtual fabric port.

9. The IHS of claim 6, wherein the NPG engine is further configured to:
detect that the link on the first port has experienced a reset event and, in response, configure the first port as the node port;
provide a second fabric login through the node port; and
configured, in response to not receiving an acceptance of the second fabric login after a first predetermined time threshold, the first port as the fabric port.

10. The IHS of claim 6, wherein the NPG engine is further configured to:
provide, when the first port is configured as the fabric port, an acceptance of a second fabric login received at the first port.

11. The IHS of claim 6, wherein the node port is a node port and the fabric port is a fabric port.

12. A method of Fibre Channel Forwarder (FCF) port configuration, comprising:
automatically configuring, by a Fibre Channel Forwarder (FCF) device that includes a plurality of ports and that is coupled to a Fibre Channel (FC) networking device through at least one of the plurality of ports, and in response to a link being established on a first port included in the plurality of ports, the first port as a node port that indicates that the first port is connected to a fabric port;
providing, by the FCF device, a first fabric login through the first port that is configured as the node port;
determining whether an acceptance of the first fabric login has been received within a first predetermined time threshold;
automatically configuring, by the FCF device and in response to not receiving an acceptance of the first fabric login within the first predetermined time threshold, the first port as the fabric port;
determining, by the FCF device, whether a second predetermined time threshold has been satisfied; and
configuring, by the FCF device and in response to the second predetermined time threshold being satisfied, any of the plurality of ports that has an established link and that have not received an acceptance of a fabric login as fabric ports.

13. The method of claim 12, further comprising:
maintaining, by the FCF device and in response to receiving an acceptance of the first fabric login before the first predetermined time threshold, the first port as the node port.

14. The method of claim 12, further comprising:
transmitting, by the FCF device, multicast discovery advertisements to a Fibre Channel over Ethernet port that is included in the plurality of ports and that is configured as a virtual fabric port.

15. The method of claim 12, further comprising:
detecting, by the FCF device, that the link on the first port has experienced a reset event and, in response, configure the first port as the node port;
providing, by the FCF device, a second fabric login through the node port; and configuring, by the FCF device and in response to not receiving an acceptance of the second fabric login after a first predetermined time threshold, the first port as the fabric port.

16. The method of claim 12, further comprising:
providing, by the FCF device and when the first port is configured as the fabric port, an acceptance of a second fabric login received at the first port.

\* \* \* \* \*